April 14, 1942.   R. A. CRAWFORD   2,279,860
METHOD OF TREATING RUBBER SURFACES AND PRODUCT THEREOF
Filed July 9, 1941
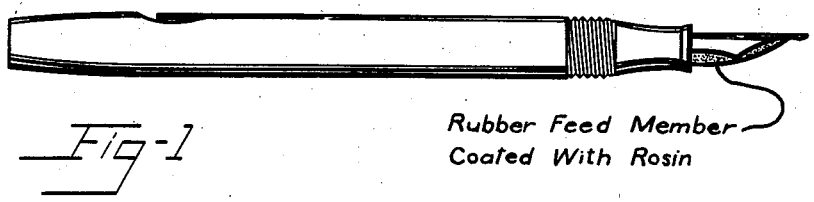
Fig-1   Rubber Feed Member Coated With Rosin
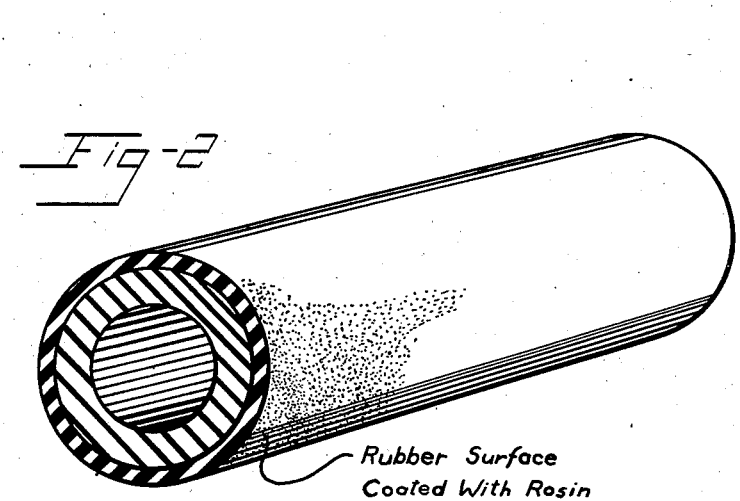
Fig-2   Rubber Surface Coated With Rosin
Inventor
Richard A. Crawford
By Willis J. Avery
Atty.

Patented Apr. 14, 1942

2,279,860

UNITED STATES PATENT OFFICE 2,279,860

METHOD OF TREATING RUBBER SURFACES AND PRODUCT THEREOF

Richard A. Crawford, Akron, Ohio, assignor to The B. F. Goodrich Company, New York, N. Y., a corporation of New York Application July 9, 1941, Serial No. 401,620

11 Claims. (Cl. 91—68)

This invention relates to products such as fountain pens, rubber covered rolls for paper mills, and similar products embodying rubber surfaces which normally are subjected to contact with watery materials during use, and is particularly concerned with a method of treating the rubber surfaces of such products to improve their wetting characteristics.

Watery materials do not wet ordinary rubber compositions readily or uniformly. This fact has caused considerable difficulty in a number of practical applications where attempts have been made to use rubber. For example, in an ordinary fountain pen, an ink-feeding member is provided underneath the metal pen point. Such ink-feeding members have been made of hard-vulcanized rubber composition and considerable difficulty has been experienced with uneven feeding of ink because of poor wetting of the rubber surface of the member by the watery vehicle of common writing inks. As another example, paper making machines embody many rolls of various types for working on the watery web of paper material. Such rolls have been made with rubber surfaces but they have not proved entirely satisfactory in all instances because of the tendency of the poorly wetted rubber surface to pick up parts of the paper web. Consequently, most paper mill rolls have been provided with surfaces of metal or granite. Other instances may be cited in which poor wetting of rubber surfaces by watery materials has led to difficulty.

Numerous efforts have been made to overcome the poor wetting characteristics of rubber. The rubber surfaces have been treated with a wide variety of commercial wetting agents which ordinarily are quite effective for improving wetting conditions. Also, such wetting agents, as well as a variety of other materials, have been incorporated in the rubber composition itself. But none of these expedients overcame the difficulty.

I have now discovered that the wetting characteristics of a rubber surface may be greatly improved by applying to the surface a very thin coating of rosin. Hard rubber ink feeding members for fountain pens which have been coated with rosin according to the present invention supply an even flow of ink to the pens and furnish satisfactory service over a long period of time. A paper mill roll having a rubber working surface provided with a thin coating of rosin is wetted very easily by the watery paper web and the difficulty previously encountered with rubber rolls picking up portions of the web is minimized.

The rosin coating should be continuous and preferably should cover completely all portions of the rubber surface which are to come in contact with the watery material. Also the rosin coating should be quite thin, preferably not more than 0.0001 inch thick. The requisite continuous and very thin coating of rosin may be applied to the rubber surface most conveniently by treating the surface with a dilute solution of rosin in a volatile solvent and thereafter evaporating the solvent. For practical purposes, the solution should contain not more than 5.0% by weight of rosin. Useful and improved results may be obtained with higher percentages, but the wetting characteristics of the surface become poorer if the quantity of rosin in the solution greatly exceeds 5.0%. Any of the various commercial grades of rosin may be used. The solvent for the rosin may be any suitable solvent in which rosin is freely soluble and which will itself wet rubber end, desirably, penetrate the surface of the rubber to some extent. Also, the solvent preferably should be of such character that no oily or other water-repellent residue is left when the solvent evaporates. Many common volatile organic solvents may be used for this purpose. As typical examples may be mentioned acetone, alcohol, butyl acetate, isopropyl acetate, methyl ethyl ketone, xylol, heptanes, and the like. Mixtures of such solvents, of course, may also be used.

A satisfactory solution for treating surfaces according to the present invention may be prepared by dissolving 2.0% by weight of common gum rosin in acetone. The rubber surfaces may be treated with the solution in any convenient manner. In the case of small articles, it will be convenient to dip the articles in the solution and then suspend them in the atmosphere until the solvent has evaporated. In treating larger articles, such as paper mill rolls, the treating solution may be wiped, brushed, or sprayed onto the rubber surface and permitted to dry thereon. As the working surfaces of paper mill rolls are subjected to some wearing action, the rosin coating on such products will need be renewed from time to time. Paper mill rolls customarily are cleaned occasionally with a solvent and it will usually be convenient simply to dissolve the required amount of rosin in the solvent used for cleaning the roll. A single operation will then serve both to clean the roll and to apply a new coating of rosin.

Typical products embodying rubber portions treated in accordance with the present invention are illustrated in the accompanying drawing of which:

Fig. 1 is an elevational view of a conventional fountain pen provided with a hard-vulcanized rubber ink-feeding member which has been coated with rosin; and Fig. 2 is a perspective view of a paper mill roll having a conventional supporting structure and a working surface of semi-hard-vulcanized rubber composition provided with a thin coating of rosin.

The invention has been described with particular reference to ink-feeding elements which normally are formed of hard-vulcanized rubber, and paper mill rolls having working surfaces which normally are formed of semi-hard-vulcanized rubber. The invention is also useful, however, in treating other types of rubber articles formed of soft-vulcanized rubber compositions and even for treating unvulcanized rubber surfaces. The unmodified term "rubber" accordingly has been used in its broadest sense to include all such rubber compositions whether vulcanized or unvulcanized and regardless of the degree of vulcanization in the case of vulcanized articles. Likewise, the "rubber" may be either a naturally occurring or an artifically prepared rubbery material.

Numerous modifications and variations in details of the procedure and materials hereinabove described may be resorted to without departing from the spirit and scope of the invention as defined by the appended claims.

I claim:

1. An article of manufacture comprising a rubber surface which is subjected to contact with watery material while in use and having on said surface a thin coating of rosin whereby improved wetting of the surface by the watery material is obtained.

2. An article of manufacture comprising a surface which is subjected to contact with watery material while in use, said surface being formed of rubber vulcanized at least to the semi-hard stage and having thereon a thin coating of rosin, whereby improved wetting of the surface by the watery material is obtained.

3. An article of manufacture comprising a hard-vulcanized rubber surface which is subjected to contact with watery material while in use and having on said surface a thin coating of rosin, whereby improved wetting of the surface by the watery material is obtained.

4. A fountain pen including an ink-contacting portion formed of rubber and having on said ink-contacting portion a thin coating of rosin, whereby improved wetting of the rubber by the ink is obtained.

5. A fountain pen including an ink-feeding member formed of hard-vulcanized rubber and having on the surface of said member a thin coating of rosin, whereby improved wetting of the member by the ink is obtained with resulting improved uniformity of feed.

6. A paper mill roll comprising a working surface formed of rubber and having thereon a thin coating of rosin, whereby improved wetting of the surface by a watery paper stock is obtained.

7. A paper mill roll comprising a working surface formed of semi-hard-vulcanized rubber and having thereon a thin coating of rosin, whereby improved wetting of the surface by a watery paper stock is obtained.

8. The method of treating a rubber surface to improve its wetting characteristics which comprises applying to the surface a thin coating of rosin.

9. The method of treating a rubber surface to improve its wetting characteristics which comprises applying to the surface a dilute solution of rosin in a volatile solvent and then evaporating the solvent.

10. The method of treating a rubber surface to improve its wetting characteristics which comprises applying to the surface a solution containing not more than 5.0% by weight of rosin dissolved in a volatile solvent and then evaporating the solvent.

11. The method of treating a rubber surface to improve its wetting characteristics which comprises applying to the surface a solution containing approximately 2% by weight of rosin dissolved in a volatile solvent and then evaporating the solvent.

RICHARD A. CRAWFORD.

CERTIFICATE OF CORRECTION.

Patent No. 2,279,860.  April 14, 1942.

RICHARD A. CRAWFORD.

It is hereby certified that error appears in the printed specification of the above numbered patent requiring correction as follows: Page 1, second column, line 21, for the word "end" read --and--; and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.